United States Patent
Kurita et al.

(10) Patent No.: US 9,289,682 B2
(45) Date of Patent: Mar. 22, 2016

(54) GAME DEVICE, CONTROL METHOD FOR A GAME DEVICE, AND INFORMATION STORAGE MEDIUM

(75) Inventors: Yusuke Kurita, Yokohama (JP);
Shinichiro Yamazaki, Koto-ku (JP);
Nozomi Akimoto, Shibuya-ku (JP);
Yohei Mimata, Minato-ku (JP); Ryogo Yamasaki, Yamato (JP)

(73) Assignee: KONAMI DIGITAL ENTERTAINMENT CO., LTD., Tokyo (JP)

(*) Notice: Subject to any disclaimer, the term of this patent is extended or adjusted under 35 U.S.C. 154(b) by 139 days.

(21) Appl. No.: 13/422,895

(22) Filed: Mar. 16, 2012

(65) Prior Publication Data
US 2012/0238364 A1 Sep. 20, 2012

(30) Foreign Application Priority Data
Mar. 18, 2011 (JP) ................................. 2011-061701

(51) Int. Cl.
*A63F 13/00* (2014.01)
*A63F 9/24* (2006.01)
(Continued)

(52) U.S. Cl.
CPC .................. *A63F 13/10* (2013.01); *A63F 13/45* (2014.09); *A63F 13/50* (2014.09); *A63F 13/67* (2014.09);
(Continued)

(58) Field of Classification Search
CPC ....... A63F 13/005; A63F 13/28; A63F 13/45; A63F 13/46; A63F 13/47; A63F 13/50; A63F 13/52; A63F 13/537; A63F 13/5375; A63F 13/5378; A63F 13/55; A63F 13/67; A63F 13/812; A63F 2300/30; A63F 2300/302; A63F 2300/303; A63F 2300/305; A63F 2300/306; A63F 2300/307; A63F 2300/60; A63F 2300/6027; A63F 2300/6054; A63F 2300/6081; A63F 2300/63; A63F 2300/632; A63F 2300/8011
USPC .......................................................... 463/31
See application file for complete search history.

(56) References Cited

U.S. PATENT DOCUMENTS

| 2003/0013533 A1* | 1/2003 | Uenishi et al. .................. 463/43 |
| 2008/0125222 A1 | 5/2008 | Okubo |
| 2010/0190551 A1* | 7/2010 | Iwakiri et al. ................... 463/31 |

FOREIGN PATENT DOCUMENTS

| EP | 1470844 A1 | 10/2004 |
| EP | 1985338 A1 | 10/2008 |

(Continued)

OTHER PUBLICATIONS

NBA Hangtime for Nintendo 64 Game console Game Manual. Retrieved from http://www.replacementdocs.com/request.php?3511 Last accessed Apr. 5, 2015.*

(Continued)

*Primary Examiner* — Milap Shah
(74) *Attorney, Agent, or Firm* — Sughrue Mion, PLLC

(57) ABSTRACT

In a case where a predetermined action is performed by a game character, a determining section determines whether or not a result of the predetermined action is a predetermined result. A determining/predicting section executes at least one of a determination as to whether or not the game character has been brought into a situation that allows the predetermined action to be performed by the game character and a prediction as to whether or not the game character will be brought into the situation. A producing section produces a presentation effect relating to the game character based on a result of the determination performed in the past by the determining section, in at least one of a case where it is determined that the game character has been brought into the situation and a case where it is predicted that the game character will be brought into the situation.

11 Claims, 6 Drawing Sheets

(51) Int. Cl.
- *A63F 13/40* (2014.01)
- *A63F 13/50* (2014.01)
- *A63F 13/45* (2014.01)
- *A63F 13/67* (2014.01)
- *A63F 13/812* (2014.01)

(52) U.S. Cl.
CPC ....... *A63F 13/812* (2014.09); *A63F 2300/6027* (2013.01); *A63F 2300/6081* (2013.01); *A63F 2300/8011* (2013.01)

(56) References Cited

FOREIGN PATENT DOCUMENTS

| JP | 2004-313767 A | 11/2004 |
|----|---------------|---------|
| JP | 2005-204948 A | 8/2005  |
| JP | 2007-014701 A | 1/2007  |

OTHER PUBLICATIONS

NBA Hangtime YouTube Video. Retrieved from https://www.youtube.com/watch?v=dLQ4o1MccsQ Last accessed Apr. 5, 2015.*

Extended European Search Report, dated Jul. 12, 2012, issued in corresponding European Application No. 12001773.6.

Sebastian Enrique: "Understanding Emotions in FIFA 07: Telling a Different Story Every 90 Minutes," Internet Citation, Mar. 9, 2007, XP001543733, Retrieved from the Internet: URL:https://www.cmpevents.com/sessions/GD/S4620i1.pdf [retrieved on Jan. 1, 1900].

Japanese Office Action in counterpart JP Patent Application No. 2011-061701 dated Jan. 28, 2014.

Japanese Office Action in corresponding to JP Patent Application 2011-061701 dated Apr. 16, 2013.

* cited by examiner

FIG.5

| ID | DRIBBLE |
|---|---|
| 1 | 0 |
| 2 | 0 |
| 3 | 1 |
| 4 | 0 |
| ... | ... |
| 9 | 3 |
| 10 | 1 |
| 11 | 1 |

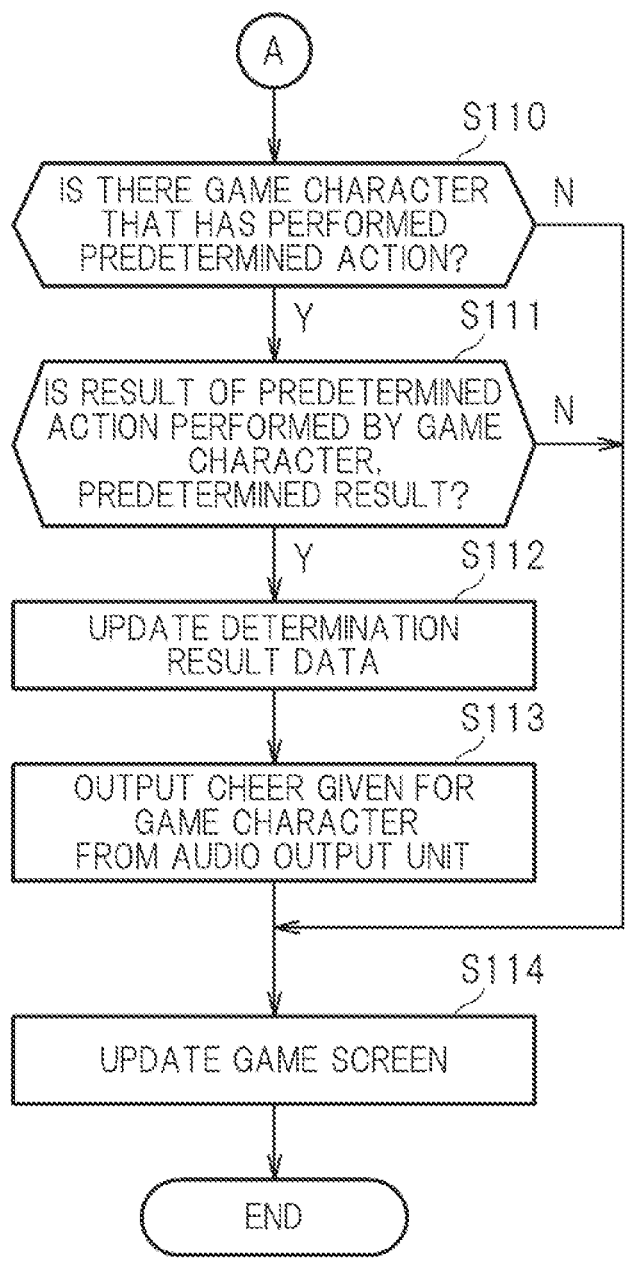

GAME DEVICE, CONTROL METHOD FOR A GAME DEVICE, AND INFORMATION STORAGE MEDIUM

CROSS-REFERENCE TO RELATED APPLICATION

The present application claims priority from Japanese application JP 2011-061701 filed on Mar. 18, 2011, the content of which is hereby incorporated by reference into this application.

BACKGROUND OF THE INVENTION

1. Field of the Invention

The present invention relates to a game device, a control method for a game device, and an information storage medium.

2. Description of the Related Art

There is known a game in which a game character performs various actions within a game space. For example, a soccer (football) game, in which game characters representing soccer players play a soccer match within a game space, is known (see, for example, JP 2007-14701 A).

Such games as described above are configured to produce a presentation effect relating to a game character. For example, a soccer game is configured to output a sound indicating a cheer given for a game character from an audio output unit when the game character outruns another game character belonging to an opponent team by dribbling (when the game character dribbles past another game character belonging to an opponent team).

SUMMARY OF THE INVENTION

In such games as described above, the entertainment value of the game can be further improved if the sophistication of the presentation effect relating to the game character can be improved. This creates a strong demand for the sophistication of the presentation effect relating to the game character to be improved in such games as described above.

The present invention has been made in view of the above-mentioned problem, and an object thereof is therefore to provide a game device, a control method for a game device, and an information storage medium capable of improving the sophistication of a presentation effect relating to a game character.

In order to solve the above-mentioned problem, according to the present invention, there is provided a game device, which executes a game configured so that a game character performs an action, including: determining means for determining whether or not a result of a predetermined action is a predetermined result in a case where the predetermined action is performed by the game character; means for storing information relating to a result of a determination performed in the past by the determining means in a storage; determining/predicting means for executing at least one of a determination as to whether or not the game character has been brought into a situation that allows the predetermined action to be performed by the game character and a prediction as to whether or not the game character will be brought into the situation that allows the predetermined action to be performed by the game character; and producing means for producing a presentation effect relating to the game character based on the result of the determination performed in the past by the determining means, in at least one of a case where it is determined that the game character has been brought into the situation that allows the predetermined action to be performed by the game character and a case where it is predicted that the game character will be brought into the situation that allows the predetermined action to be performed by the game character.

According to the present invention, there is also provided a control method for a game device, which executes a game configured so that a game character performs an action, the control method including: determining whether or not a result of a predetermined action is a predetermined result in a case where the predetermined action is performed by the game character; storing information relating to a result of a determination performed in the past in the determining in a storage; executing at least one of a determination as to whether or not the game character has been brought into a situation that allows the predetermined action to be performed by the game character and a prediction as to whether or not the game character will be brought into the situation that allows the predetermined action to be performed by the game character; and producing a presentation effect relating to the game character based on the result of the determination performed in the past in the determining, in at least one of a case where it is determined that the game character has been brought into the situation that allows the predetermined action to be performed by the game character and a case where it is predicted that the game character will be brought into the situation that allows the predetermined action to be performed by the game character.

According to the present invention, there is further provided a program for controlling a computer to function as a game device which executes a game configured so that a game character performs an action, the program controlling the computer to function as: determining means for determining whether or not a result of a predetermined action is a predetermined result in a case where the predetermined action is performed by the game character; means for storing information relating to a result of a determination performed in the past by the determining means in a storage; determining/predicting means for executing at least one of a determination as to whether or not the game character has been brought into a situation that allows the predetermined action to be performed by the game character and a prediction as to whether or not the game character will be brought into the situation that allows the predetermined action to be performed by the game character; and producing means for producing a presentation effect relating to the game character based on the result of the determination performed in the past by the determining means, in at least one of a case where it is determined that the game character has been brought into the situation that allows the predetermined action to be performed by the game character and a case where it is predicted that the game character will be brought into the situation that allows the predetermined action to be performed by the game character.

According to the present invention, there is further provided a non-transitory computer readable information storage medium storing the above-mentioned program.

According to the present invention, it is possible to improve the sophistication of the presentation effect relating to the game character.

Further, according to the exemplary embodiment of the present invention, the producing means may include means for determining whether or not the result of the determination performed in the past by the determining means satisfies a predetermined condition. The producing means may determine whether or not to produce the presentation effect based on a determination result as to whether or not the result of the determination performed in the past by the determining means satisfies the predetermined condition.

Further, according to the exemplary embodiment of the present invention, the producing means may include means for controlling a time at which produce the presentation effect based on the result of the determination performed in the past by the determining means in a case of producing the presentation effect.

Further, according to the exemplary embodiment of the present invention, the producing means may include: means for outputting a sound as the presentation effect from audio output means; and means for controlling at least one of a type of the sound, an output volume thereof, and a reproduction speed thereof based on the result of the determination performed in the past by the determining means.

Further, according to the exemplary embodiment of the present invention, the game device may further include means for displaying a game screen on display means. The producing means may include: means for producing the presentation effect on the game screen; and means for controlling a manner of the presentation effect produced on the game screen based on the result of the determination performed in the past by the determining means.

Further, according to the exemplary embodiment of the present invention, the game may include a game configured so that game characters compete in a competition carried out by using a moving object. The predetermined action may include a predetermined action performed by the game character in a case where the game character keeps the moving object. The determining/predicting means may determine whether or not a distance between the game character and the moving object is equal to or shorter than a reference distance to thereby predict whether or not the game character will be brought into the situation that allows the predetermined action to be performed by the game character. The determining/predicting means may include means for setting the reference distance based on the result of the determination performed in the past by the determining means.

BRIEF DESCRIPTION OF THE DRAWINGS

In the accompanying drawings:

FIG. 5 is a diagram illustrating an example of determination result data;

FIG. 7 is a flowchart illustrating an example of the processing executed by the game device.

DETAILED DESCRIPTION OF THE INVENTION

Hereinafter, a detailed description is given of an example of an exemplary embodiment of the present invention with reference to the drawings. A game device according to the exemplary embodiment of the present invention is implemented by, for example, a consumer game machine (stationary game machine), a portable game machine, a mobile phone, a personal digital assistant (PDA), or a personal computer. Herein, a description is given of a case where the game device according to the exemplary embodiment of the present invention is implemented by a consumer game machine.

Figure 1:
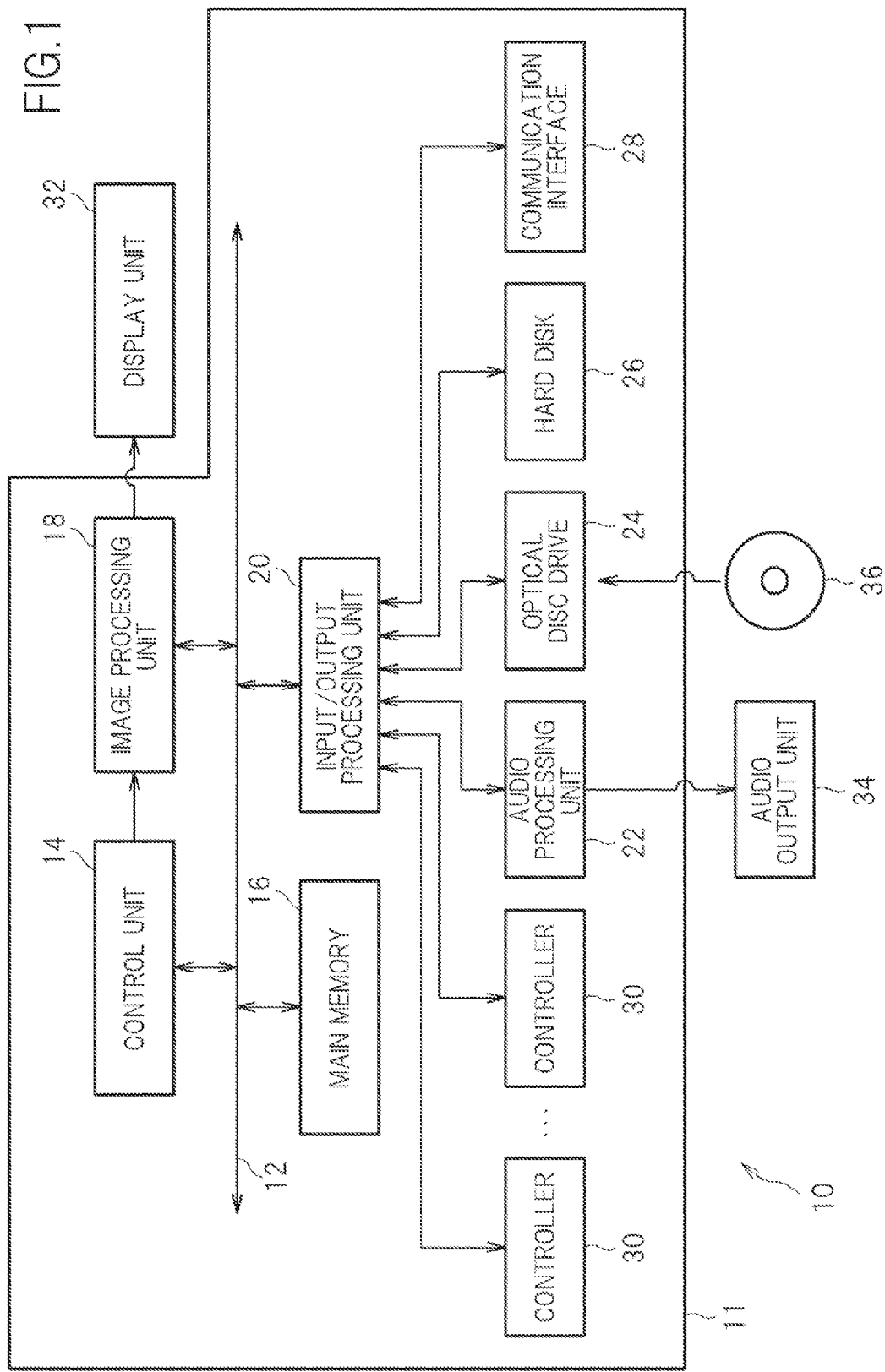
FIG. 1 is a diagram illustrating a hardware configuration of a game device according to an exemplary embodiment of the present invention.

FIG. 1 illustrates a hardware configuration of the game device according to this embodiment. As illustrated in FIG. 1, a game device 10 includes a consumer game machine 11, a display unit 32, an audio output unit 34, and an optical disc 36 (information storage medium). The display unit 32 and the audio output unit 34 are connected to the consumer game machine 11. The display unit 32 may be a display device such as a consumer television set or a liquid crystal display, for example. The audio output unit 34 may be an audio outputting device such as a speaker included in the consumer television set or headphones, for example.

The consumer game machine 11 is a known computer game system. The consumer game machine 11 includes a bus 12, a control unit 14, a main memory 16, an image processing unit 18, an input/output processing unit 20, an audio processing unit 22, an optical disc drive 24, a hard disk 26, a communication interface 28, and a controller 30.

The control unit 14 includes one or a plurality of microprocessors. The control unit 14 executes control processing and information processing based on a program read from the optical disc 36. The main memory 16 includes, for example, a RAM. The program and data read from the optical disc 36 are written into the main memory 16. The main memory 16 is also used as a working memory for the control unit 14. The bus 12 is used for exchanging addresses and data among the components of the consumer game machine 11.

The image processing unit 18 includes a VRAM, and renders, based on image data supplied from the control unit 14, a screen in the VRAM. Then, the image processing unit 18 converts the screen rendered in the VRAM into video signals, and outputs the video signals to the display unit 32.

The input/output processing unit 20 is an interface for the control unit 14 to access the audio processing unit 22, the optical disc drive 24, the hard disk 26, the communication interface 28, and the controller 30. The audio processing unit 22 includes a sound buffer, and outputs, from the audio output unit 34, audio data that has been loaded from the optical disc 36 into the sound buffer. The communication interface 28 is an interface for connecting the consumer game machine 11 to a communication network such as the Internet by wire or wirelessly.

The optical disc drive 24 reads a program or data recorded on the optical disc 36. Herein, the optical disc 36 is used for supplying the program or the data to the consumer game machine 11. Alternatively, another information storage medium, such as a memory card, may be used. Alternatively, the program or the data may be supplied to the consumer game machine 11 from a remote place via a communication network, for example. The hard disk 26 is a commonly-used hard disk device (auxiliary storage device). The program or the data, which is supposed to be stored in the optical disc 36 in the following description, may be stored in the hard disk 26.

The controller 30 is an operation portion for a user to perform operations. A plurality of the controllers 30 may be connected to the consumer game machine 11 by wire or wirelessly. A controller 30 includes a plurality of operation members such as, for example, a plurality of buttons and a plurality of levers (sticks). The input/output processing unit 20 scans states of the operation members of the controller 30 at fixed intervals (for example, every $1/60^{th}$ of a second), and then provides an operation signal indicating a result of the scanning to the control unit 14 via the bus 12. The control unit 14 makes judgment on the user's game operation based on the operation signal.

In the game device 10, a game in which a game character performs various actions within a game space is executed based on the program stored in the optical disc 36. For example, a sports game configured so that the game characters compete in a sports competition is executed. For example, a sports game configured so that the game characters compete in a sports competition carried out by using a moving object (such as a ball or a puck, for example) is executed.

Hereinafter, a description is given of the case of executing in the game device 10 a soccer game which is an example of the above-mentioned sports game. In the soccer game, a soccer match is played between a team operated by the user (hereinafter, referred to as "user team") and a team operated by an opponent (hereinafter, referred to as "opponent team"). Note that the opponent may be a computer or another user. Hereinafter, the case where the opponent is a computer is described.

Figure 2:
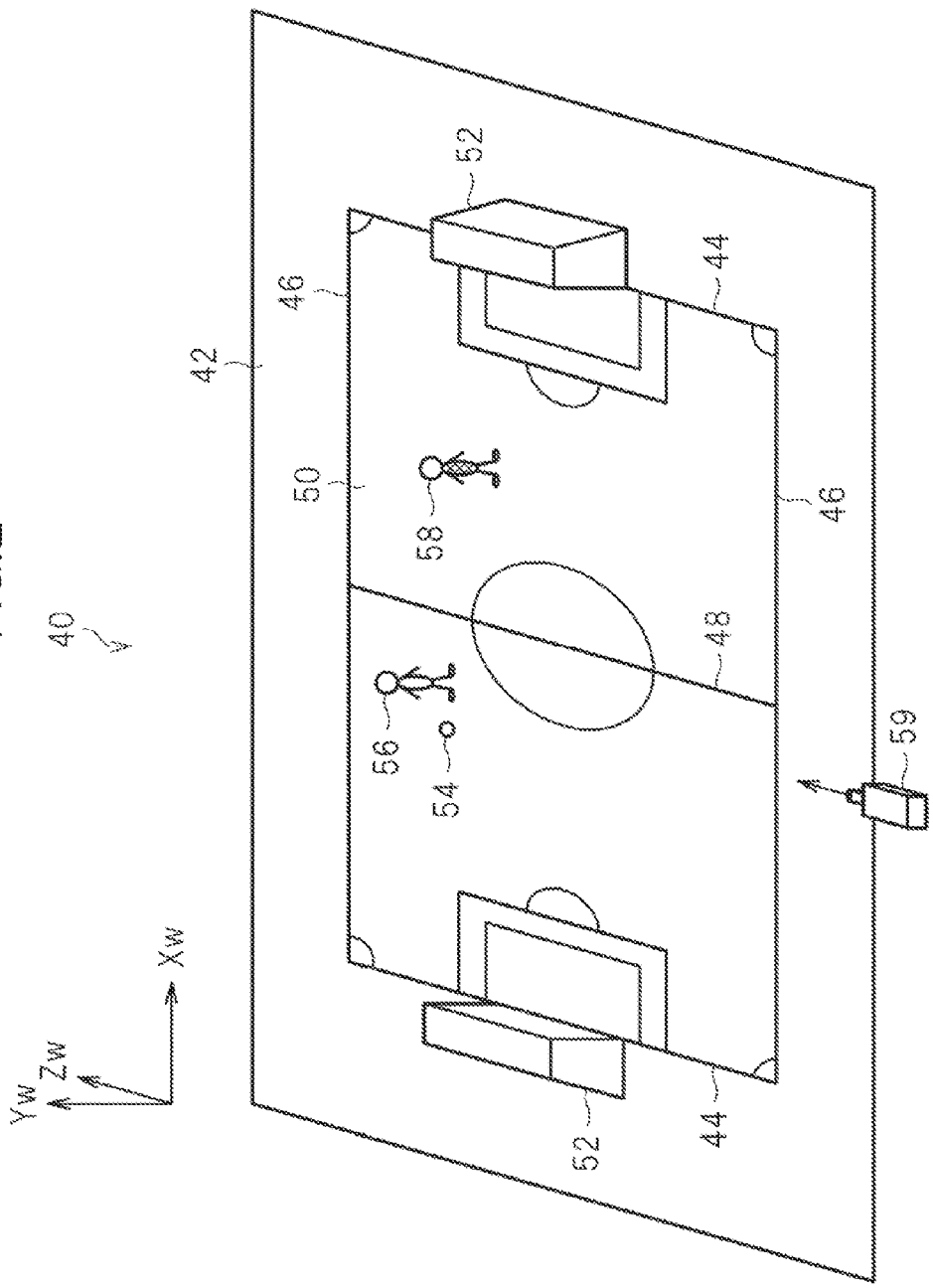
FIG. 2 is a view illustrating an example of a game space.

When the above-mentioned soccer game is executed, a game space is built in the main memory 16. FIG. 2 illustrates an example of the game space. A game space 40 illustrated in FIG. 2 is a virtual three-dimensional space in which three coordinate axes (an Xw-axis, a Yw-axis, and a Zw-axis) which perpendicularly cross each other are set. The position of an object disposed in the game space 40 and the like are specified by the three coordinate axes.

In the game space 40 illustrated in FIG. 2, a field 42 corresponding to an object representing a soccer field is disposed. On the field 42, goal lines 44, touch lines 46, a halfway line 48, and the like are drawn. A soccer match is played on a pitch 50, which is a region surrounded by the two goal lines 44 and the two touch lines 46. The halfway line 48 is a straight line connecting midpoints of the two touch lines 46, and divides the pitch 50 into halves.

In addition, on the field 42, there are disposed goals 52, which are objects representing soccer goals, and a ball 54, which is an object representing a soccer ball. One of the goals 52 is associated with the user team, whereas the other one of the goals 52 is associated with the opponent team. When the ball 54 moves into the goal 52 associated with any one of the teams, a scoring event occurs for the other one of the teams.

In addition, on the field 42, there are disposed a game character 56, which is an object representing a soccer player belonging to the user team, and a game character 58, which is an object representing a soccer player belonging to the opponent team. Eleven game characters 56 belonging to the user team and eleven game characters 58 belonging to the opponent team are disposed, although the illustration thereof is omitted in FIG. 3.

When a game character 56 (58) and the ball 54 come close to each other, the game character 56 (58) and the ball 54 become associated with each other under a predetermined condition. In this case, the moving action of the game character 56 (58) becomes a dribbling action. The state in which the ball 54 is associated with the game character 56 (58) is hereinafter referred to as a state in which "the game character 56 (58) keeps the ball 54".

In addition, a virtual camera 59 (viewpoint) is set in the game space 40. A game screen illustrating a situation of the game space 40, which is viewed from the virtual camera 59, is displayed on the display unit 32. For example, in order to constantly display the ball 54 on the game screen, the virtual camera 59 moves around based on the position of the ball 54.

Figure 3:
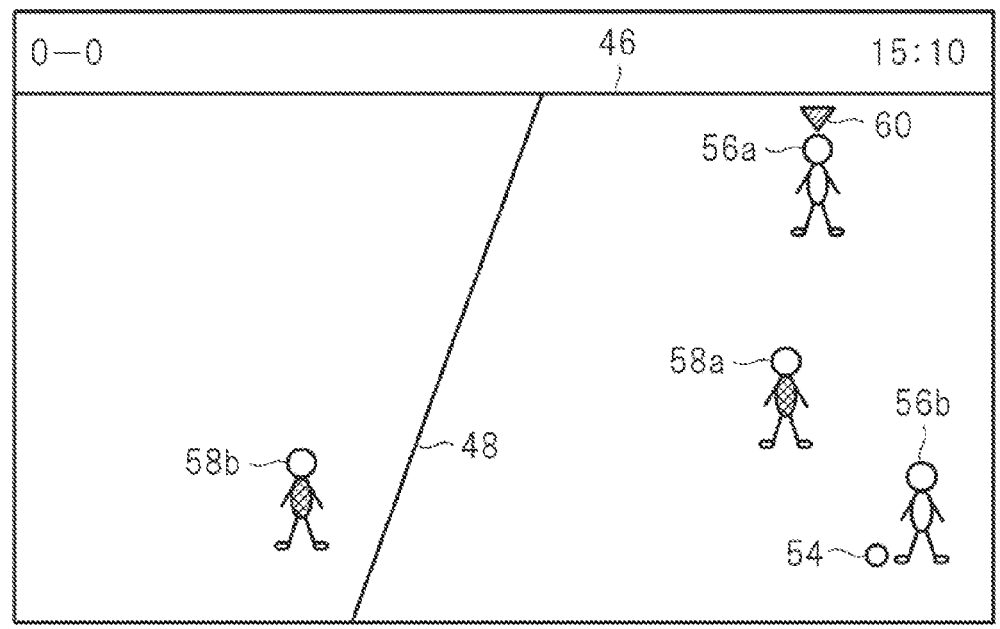
FIG. 3 is a view illustrating an example of a game screen.

FIG. 3 illustrates an example of the game screen. On the game screen illustrated in FIG. 3, two game characters 56a and 56b belonging to the user team and two game characters 58a and 58b belonging to the opponent team are displayed.

In the soccer game, any of the game characters 56 belonging to the user team is set as an operation subject of the user. The operation subject of the user is switched among the game characters 56 belonging to the user team. On the game screen illustrated in FIG. 3, a cursor 60 is displayed above a head of the game character 56a. The cursor 60 functions to guide the game character 56 set as the operation subject of the user. Note that the operation subject of the user may be fixed to one of the game characters 56.

The game character 56 set as the operation subject of the user acts based on the operation of the user. On the other hand, the game characters 56 which are not set as the operation subject of the user among the game characters 56 belonging to the user team act autonomously according to artificial intelligence (AI). The game characters 58 belonging to the opponent team also act autonomously according to the AI.

The game device 10 is configured to produce a presentation effect relating to the game character 56 when a predetermined action is performed by the game character 56 and produces a predetermined result. For example, a sound indicating a cheer given for the game character 56 is output when the game character 56 performs a dribble and outruns the game character 58 belonging to the opponent team while the game character 56 is executing the dribble.

In addition, the game device 10 is configured to produce the presentation effect relating to the game character 56 in a more sophisticated manner. More specifically, the presentation effect relating to the game character 56 is produced even in a case where it is expected that "a predetermined action is performed by the game character 56 and produces a predetermined result". For example, the sound indicating the cheer given for the game character 56 is output in a case where it is expected that "the game character 56 performs a dribble and outruns the game character 58 belonging to the opponent team during the execution of the dribble". Hereinafter, a description is given of a technology for implementing the above-mentioned function (that is, in the above-mentioned soccer game, technology for improving the sophistication of the presentation effect relating to the game character 56).

Figure 4:
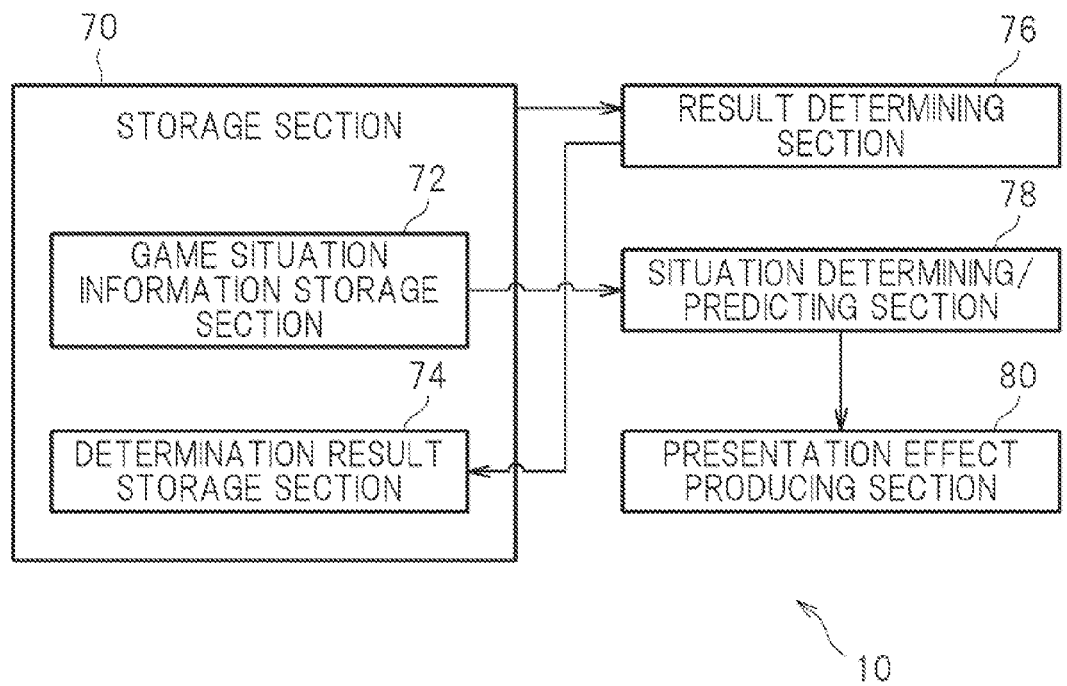
FIG. 4 is a functional block diagram of the game device according to the exemplary embodiment of the present invention.

FIG. 4 is a functional block diagram illustrating functions implemented in the game device 10. As illustrated in FIG. 4, the game device 10 functionally includes a storage section 70, a result determining section 76, a situation determining/predicting section 78, and a presentation effect producing section 80. The storage section 70 is implemented by, for example, the main memory 16 and the optical disc 36, whereas the other functional blocks are implemented by the control unit 14 executing the program read from the optical disc 36.

First, the storage section 70 is described. The storage section 70 stores data necessary for executing the game. For example, the storage section 70 stores model data indicating a shape of each object disposed in the game space 40 and motion data indicating a change in posture when the game character 56 (58) performs an action. Note that in the following description, changing the posture of the game character 56 (58) based on the motion data is referred to as "reproducing the motion data".

The storage section 70 includes a game situation information storage section 72. The game situation information storage section 72 stores game situation data. The game situation data is data for retaining various types of information relating to current situations of the game (game situation information). For example, the game situation data retains such information as described below.

(1) State information (for example, position, moving direction, moving speed, and the like) on each of the game characters 56 and (2) State information (for example, position, moving direction, moving speed, and the like) on the ball 54
(3) Score information on the user team and the opponent team
(4) Elapsed time information on a match Note that the state information on the game character 56 (58) also includes information for identifying the type of action that is currently being performed by the game character 56 (58) (hereinafter, referred to as "action identification information"). For example, when the game character 56 (58) is instructed to perform a dribble by the user or the AI, the action identification information on the game character 56 (58) is set to a "dribble". In this case, the motion data on the "dribble" regarding the game character 56 (58) is reproduced, and the game character 56 (58) performs a dribble.

Further, the state information on the game character 56 also includes information indicating whether or not the game character 56 is set as an operation subject of the user. Further, the state information on the ball 54 also includes information indicating a state of keeping the ball 54. That is, the state information on the ball 54 includes information indicating whether or not the ball 54 is being kept by any one of the game characters 56 and 58 and information indicating the one of the game characters 56 and 58 that keeps the ball 54.

The storage section 70 also includes a determination result storage section 74. The determination result storage section 74 stores information relating to a result of a determination performed in the past one or a plurality of times by the result determining section 76 described later. The determination result storage section 74 is described later in detail (see FIG. 5). Next described is the result determining section 76. The result determining section 76 determines whether or not a predetermined action has been performed by the game character 56. When it is determined that the predetermined action has been performed by the game character 56, the result determining section 76 determines whether or not a result of the predetermined action performed by the game character 56 is a predetermined result. Note that it is determined based on the action identification information on the game character 56 whether or not the predetermined action has been performed by the game character 56. Further, a "case where the result of the action is the predetermined result" refers to, for example, a case where the action is successful or an object of the action has been achieved.

The following description is given on the assumption that the dribble corresponds to the "predetermined action". However, an action other than the dribble may correspond to the "predetermined action". For example, a free kick, a shot, or the like may correspond to the "predetermined action".

When a dribble is performed by the game character 56, the result determining section 76 determines whether or not the result of the dribble is the predetermined result. A "case where the result of the dribble is the predetermined result" refers to, for example, a case where the dribble is successful, and more specifically, for example, a case where the game character 56 has dribbled past the game character 58 belonging to the opponent team without having the ball 54 taken away by the game character 58.

Figure 5:
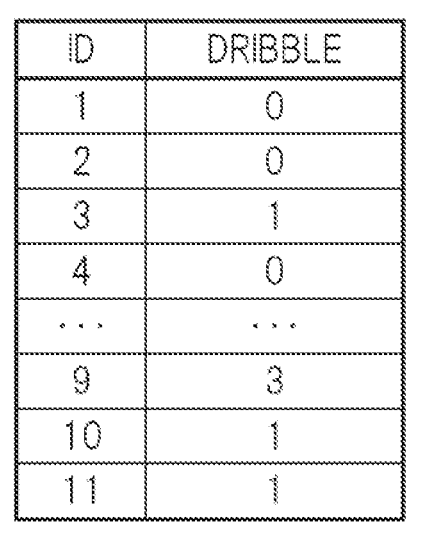

Note that as described above, the information relating to the result of the determination performed in the past one or a plurality of times by the result determining section 76 is stored in the determination result storage section 74. FIG. 5 illustrates an example of determination result data stored in the determination result storage section 74. The determination result data is data for retaining the information relating to the result of the determination performed in the past one or a plurality of times by the result determining section 76.

The determination result data illustrated in FIG. 5 includes an "ID" field and a "dribble" field. The determination result data includes eleven records corresponding to the eleven game characters 56 belonging to the user team. One record corresponds to one game character 56.

The "ID" field indicates information (ID) for uniquely identifying the game character 56 belonging to the user team. The "dribble" field indicates the number of times that it has been determined that the dribble is successful (that is, the result of the dribble is the predetermined result). For example, the value of the "dribble" field within the record whose "ID" field has a value of "1" indicates the number of times that it has been determined that the dribble performed by the game character 56 whose ID is "1" is successful.

The value of the "dribble" field is initialized to "0" at the start of a match. Therefore, the value of the "dribble" field indicates the number of times that it has been determined that the dribble performed by the game character 56 is successful in the currently played match. Note that the value of the "dribble" field may not be initialized to "0" at the start of the match. In this case, the value of the "dribble" field indicates the number of times that it has been determined that the dribble performed by the game character 56 is successful in the currently played match and matches played before the currently played match.

Next described is the situation determining/predicting section 78. The situation determining/predicting section 78 executes at least one of a determination as to whether or not the game character 56 has been brought into a situation that allows the predetermined action to be performed by the game character 56 and a prediction as to whether or not the game character 56 will be brought into the situation that allows the predetermined action to be performed by the game character 56.

The situation determining/predicting section 78 determines whether or not the current situation becomes a predetermined situation to thereby determine whether or not the game character 56 has been brought into the situation that allows the predetermined action to be performed by the game character 56. Further, for example, the situation determining/predicting section 78 predicts whether or not the future situation will become a predetermined situation to thereby predict whether or not the game character 56 will be brought into the situation that allows the predetermined action to be performed by the game character 56.

As described above, in this embodiment, the dribble corresponds to the "predetermined action". Therefore, the "situation that allows the predetermined action (dribble) to be performed by the game character 56" refers to a case where the game character 56 keeps the ball 54. Therefore, in a case where the state of the game character 56 is changed from a state of not keeping the ball 54 to a state of keeping the ball 54, the situation determining/predicting section 78 determines that the game character 56 has been brought into the situation that allows the dribble (predetermined action) to be performed by the game character 56.

Further, in a case where it is predicted that the game character 56 will keep the ball 54 in the near future, the situation determining/predicting section 78 predicts that the game character 56 will be brought into the situation that allows the dribble (predetermined action) to be performed by the game character 56. The "case where it is predicted that the game character 56 will keep the ball 54 in the near future" refers to, for example, a case where a pass has been performed toward the game character 56 with the ball 54 moving toward the game character 56. Further, the "case where it is predicted that the game character 56 will keep the ball 54 in the near future"

may refer to, for example, a case where the ball 54 is in a state of being a loose ball with the game character 56 being located in a position that is nearest to the ball 54. Note that the "state of being a loose ball" refers to a state in which the ball 54 is kept by neither of the game characters 56 and 58.

Next described is the presentation effect producing section 80. The presentation effect producing section 80 produces a presentation effect relating to the game character 56. The "presentation effect" includes at least one of an audio presentation effect and a visual presentation effect.

The "audio presentation effect" means a presentation effect realized by a sound output from the audio output unit 34. Examples of the "audio presentation effect" include outputting the sound indicating the cheer given for the game character 56 from the audio output unit 34.

The "visual presentation effect" means a presentation effect produced on the game screen displayed on the display unit 32. Examples of the "visual presentation effect" include displaying an image indicating the presentation effect on the game screen. Specifically, the examples include displaying an image indicating the cheer given for the game character 56 on the game screen. The examples of the "visual presentation effect" also include changing a manner of displaying the game character 56. Specifically, the examples include changing a color of the game character 56 for the sake of distinction from the other game characters 56 or causing the game character 56 to glow.

When the result determining section 76 determines that the result of the predetermined action performed by the game character 56 is the predetermined result, the presentation effect producing section 80 produces the presentation effect relating to the game character 56. For example, when it is determined that the dribble performed by the game character 56 is successful, the presentation effect producing section 80 outputs the sound indicating the cheer given for the game character 56 from the audio output unit 34.

In addition, the presentation effect producing section 80 produces the presentation effect relating to the game character 56 based on the result of the determination performed the past one or a plurality of times by the result determining section 76, in at least one of a case where it is determined that the game character 56 has been brought into the situation that allows the predetermined action to be performed by the game character 56 and a case where it is predicted that the game character 56 will be brought into the situation that allows the predetermined action to be performed by the game character 56.

For example, the presentation effect producing section 80 outputs the sound indicating the cheer given for the game character 56 from the audio output unit 34 based on the result of the determination performed the past one or a plurality of times by the result determining section 76, in at least one of a case where it is determined that the game character 56 has been brought into the situation that allows the dribble to be performed by the game character 56 and a case where it is predicted that the game character 56 will be brought into the situation that allows the dribble to be performed by the game character 56.

Hereinafter, descriptions are given of specific examples (A) to (F) of the "producing (outputting) the presentation effect relating to the game character 56 (for example, sound indicating the cheer given for the game character 56) based on the result of the determination performed in the past one or a plurality of times by the result determining section 76".

(A) For example, the presentation effect producing section 80 determines whether or not the result of the determination performed the past one or a plurality of times by the result determining section 76 satisfies a predetermined condition, and determines, based on a determination result thereof, whether or not to produce the presentation effect relating to the game character 56. Here, the "predetermined condition" is, for example, a condition as to whether or not the number of times that it has been determined in the past that the result of the predetermined action performed by the game character 56 is the predetermined result is equal to or larger than a reference number of times.

For example, the presentation effect producing section 80 determines whether or not the number of times that it has been determined in the past that the dribble performed by the game character 56 is successful is equal to or larger than the reference number of times. When the above-mentioned number of times is equal to or larger than the reference number of times, the presentation effect producing section 80 determines that the sound indicating the cheer given for the game character 56 is to be output. On the other hand, when it is determined that the above-mentioned number of times is smaller than the reference number of times, the presentation effect producing section 80 restricts (for example, inhibits) the outputting of the sound indicating the cheer given for the game character 56.

(B) Further, for example, in a case of producing the presentation effect relating to the game character 56, the presentation effect producing section 80 controls a time at which to produce the presentation effect based on the result of the determination performed in the past one or a plurality of times by the result determining section 76. For example, the presentation effect producing section 80 controls the time at which to produce the presentation effect relating to the game character 56 based on the number of times that it has been determined in the past by the result determining section 76 that the result of the predetermined action performed by the game character 56 is the predetermined result.

For example, the presentation effect producing section 80 changes a time at which to output the sound indicating the cheer given for the game character 56 based on the number of times that it has been determined in the past that the dribble performed by the game character 56 is successful. For example, in the case where the above-mentioned number of times is equal to or larger than the reference number of times, the presentation effect producing section 80 advances the time at which to output the sound indicating the cheer given for the game character 56 as compared to the case where the above-mentioned number of times is smaller than the reference number of times.

More specifically, for example, in the case where the above-mentioned number of times is smaller than the reference number of times, the presentation effect producing section 80 outputs the sound indicating the cheer given for the game character 56 at a time point when the game character 56 is actually brought into a situation that allows the dribble to be started by the game character 56. On the other hand, in the case where the above-mentioned number of times is equal to or larger than the reference number of times, the presentation effect producing section 80 outputs the sound indicating the cheer given for the game character 56 at the time point when it is predicted that the game character 56 will be brought into the situation that allows the dribble to be started by the game character 56.

(C) Further, for example, in a case of outputting a sound as the presentation effect relating to the game character 56, the presentation effect producing section 80 changes the type of sound based on the result of the determination performed the past one or a plurality of times by the result determining section 76. For example, the presentation effect producing section 80 changes the type of sound based on the number of times that it has been determined in the past by the result determining section 76 that the result of the predetermined action performed by the game character 56 is the predetermined result.

More specifically, for example, the presentation effect producing section 80 changes over the type of sound indicating the cheer given for the game character 56 between the case where the number of times that it has been determined in the past that the dribble performed by the game character 56 is successful is equal to or larger than the reference number of times and the case where the above-mentioned number of times is smaller than the reference number of times. For example, in the case where the above-mentioned number of times is smaller than the reference number of times, the presentation effect producing section 80 outputs the sound indicating the cheer of a relatively small number of spectators, and in the case where the above-mentioned number of times is equal to or larger than the reference number of times, the presentation effect producing section 80 outputs the sound indicating the cheer of a relatively large number of spectators.

(D) Further, for example, in the case of outputting the sound as the presentation effect relating to the game character 56, the presentation effect producing section 80 controls an output volume of the sound or a reproduction speed thereof based on the result of the determination performed the past one or a plurality of times by the result determining section 76. For example, the presentation effect producing section 80 changes the output volume of the sound or the reproduction speed thereof based on the number of times that it has been determined in the past by the result determining section 76 that the result of the predetermined action performed by the game character 56 is the predetermined result.

More specifically, for example, based on the number of times that it has been determined in the past that the dribble performed by the game character 56 is successful, the presentation effect producing section 80 raises or lowers the output volume of the sound indicating the cheer given for the game character 56. That is, in the case where the above-mentioned number of times is equal to or larger than the reference number of times, the presentation effect producing section 80 sets the output volume of the sound to a higher level than in the case where the above-mentioned number of times is smaller than the reference number of times.

Further, for example, based on the number of times that it has been determined in the past that the dribble performed by the game character 56 is successful, the presentation effect producing section 80 increases or reduces the reproduction speed of the sound indicating the cheer given for the game character 56. That is, in the case where the above-mentioned number of times is equal to or larger than the reference number of times, the presentation effect producing section 80 sets the reproduction speed of the sound to a higher rate than in the case where the above-mentioned number of times is smaller than the reference number of times.

(E) Further, for example, in a case of producing the presentation effect relating to the game character 56 on the game screen, the presentation effect producing section 80 controls the manner of the presentation effect produced on the game screen based on the result of the determination performed in the past one or a plurality of times by the result determining section 76. For example, the presentation effect producing section 80 changes the manner of the presentation effect produced on the game screen based on the number of times that it has been determined in the past by the result determining section 76 that the result of the predetermined action performed by the game character 56 is the predetermined result.

For example, the "changing the manner of the presentation effect" refers to the changing of the type of presentation effect. For example, in a case of displaying the image indicating the cheer given for the game character 56 on the game screen as the presentation effect, the presentation effect producing section 80 changes the type of image indicating the cheer given for the game character 56 based on the number of times that it has been determined in the past that the dribble performed by the game character 56 is successful. For example, in the case where the above-mentioned number of times is smaller than the reference number of times, the presentation effect producing section 80 displays an image indicating the cheer of the relatively small number of spectators on the game screen, and in the case where the above-mentioned number of times is equal to or larger than the reference number of times, the presentation effect producing section 80 displays an image indicating the cheer of the relatively large number of spectators on the game screen.

Further, the "changing the manner of the presentation effect" may be the changing of a size of the image, a density thereof, a color thereof, or the like. For example, in the case of displaying the image indicating the cheer given for the game character 56 on the game screen as the presentation effect, the presentation effect producing section 80 may change the size, density, color, or the like of the image indicating the cheer given for the game character 56 based on the number of times that it has been determined in the past that the dribble performed by the game character 56 is successful. Further, for example, in the case of causing the game character 56 to glow as the presentation effect, the presentation effect producing section 80 may change the extent to which the game character 56 is to be caused to glow based on the number of times that it has been determined in the past that the dribble performed by the game character 56 is successful.

Note that a plurality of approaches selected from among the approaches (A) to (E) described above may be combined.

Figure 6:
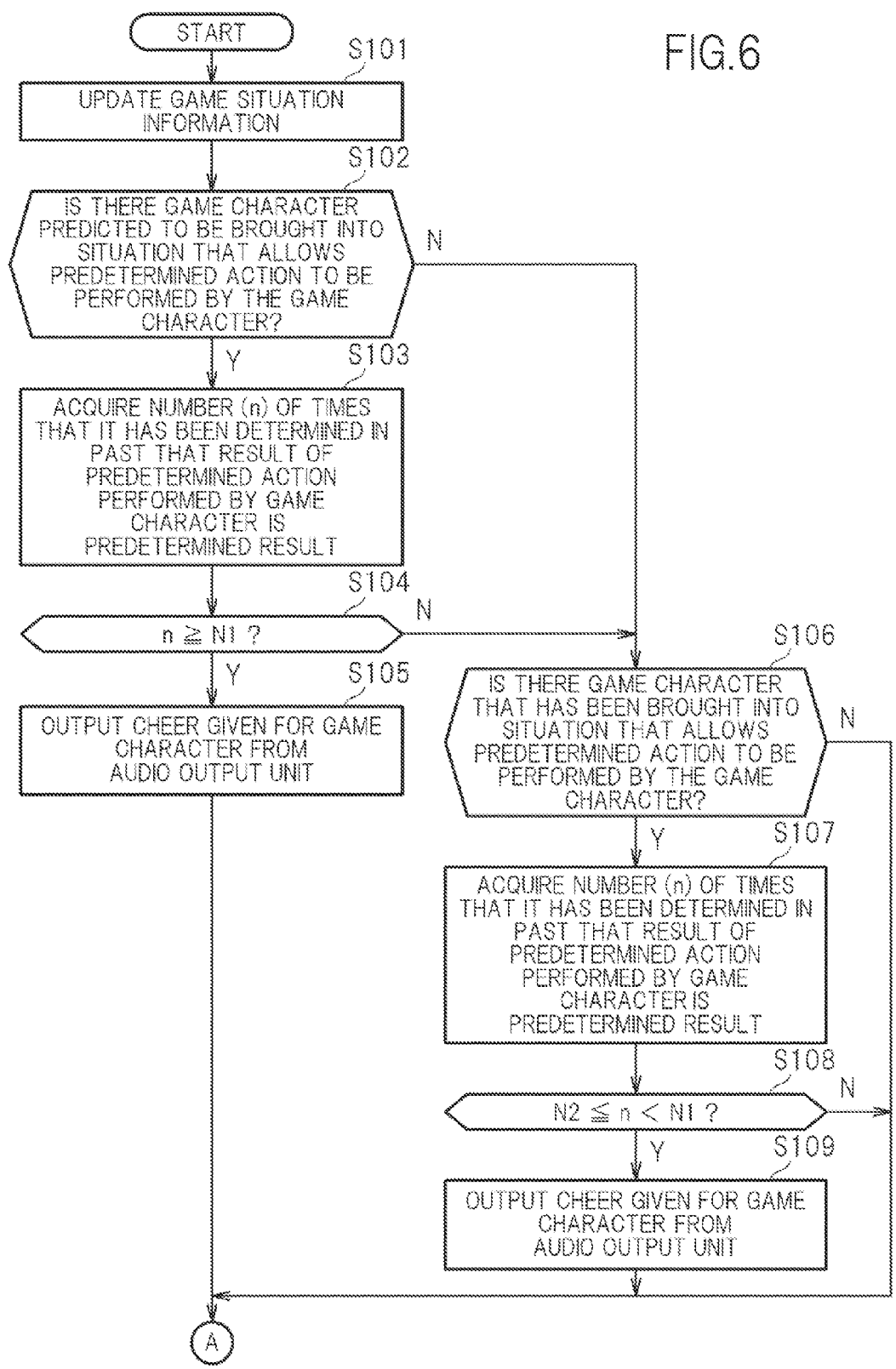
FIG. 6 is a flowchart illustrating an example of processing executed by the game device.

Next, a description is given of processing for implementing the above-mentioned functional blocks. FIG. 6 and FIG. 7 are flowcharts mainly illustrating the processing relating to the present invention among processing executed at predetermined time intervals (for example, every $\frac{1}{60}^{th}$ of a second) by the game device 10. The control unit 14 executes the processing illustrated in FIG. 6 and FIG. 7 according to the program read from the optical disc 36. The processing illustrated in FIG. 6 and FIG. 7 is executed to thereby implement the result determining section 76, the situation determining/predicting section 78, and the presentation effect producing section 80.

Note that the processing illustrated in FIG. 6 and FIG. 7 is processing performed in the case of outputting the sound indicating the cheer given for the game character 56 as the presentation effect. Further, the processing illustrated in FIG. 6 and FIG. 7 is processing performed in the case of employing an approach obtained by combining the approaches (A) and (B) described above as the manner of "producing the presentation effect relating to the game character 56 based on the result of the determination performed in the past one or a plurality of times by the result determining section 76".

As illustrated in FIG. 6, the control unit 14 first updates the game situation information (S101). For example, the control unit 14 updates the state information on the game character 56 that is set as the operation subject of the user based on an operation signal supplied from the controller 30. Further, for example, the control unit 14 updates the state information on the game characters 56 and 58 that are not set as the operation subject of the user based on the AI. In addition thereto, the control unit 14 updates the state information on the ball 54, the score information, and the elapsed time information.

After that, the control unit 14 executes the processing (S102 to S109) for producing the presentation effect relating to the game character 56.

First, the control unit 14 (situation determining/predicting section 78) determines whether or not the game characters 56 belonging to the user team include the game character 56 predicted to be brought into the situation that allows the predetermined action to be performed by the game character 56 in the near future (S102). As described above, in the case of this embodiment, the dribble corresponds to the "predetermined action". Therefore, the control unit 14 determines whether or not the game character 56 predicted to be brought into the situation that allows the dribble to be performed by the game character 56 exists. The control unit 14 executes the determination based on the game situation information.

For example, in the case where a pass has been performed toward any one of the game characters 56 with the ball 54 moving toward the one of the game characters 56, the control unit 14 predicts that the one of the game characters 56 will be brought into the situation that allows the dribble to be performed by the game character 56 in the near future. Further, for example, in the case where the ball 54 is in the state of being a loose ball with any one of the game characters 56 being located in the position that is nearest to the ball 54, the control unit 14 predicts that the one of the game characters 56 will be brought into the situation that allows the dribble to be performed by the game character 56 in the near future.

If it is determined in Step S102 that the game characters 56 include the game character 56 predicted to be brought into the situation that allows the predetermined action to be performed by the game character 56 in the near future, the control unit 14 reads the number (n) of times that it has been determined in the past that the result of the predetermined action performed by the game character 56 is the predetermined result from the determination result data (see FIG. 5) (S103).

For example, when the game character 56 predicted in Step S102 to be brought into the situation that allows the dribble to be performed by the game character 56 in the near future is the game character 56 whose ID is "10", the number (n) of times that it has been determined in the past that the dribble performed by the game character 56 whose ID is "10" is successful is read. That is, the value of the "dribble" field within a record whose "ID" field has a value of "10" is read from the determination result data (see FIG. 5).

After the processing of Step S103 is executed, the control unit 14 (presentation effect producing section 80) determines whether or not the number (n) of times acquired in Step S103 satisfies a relationship of "n≥N1" (S104). Here, "N1" represents the reference number of times. The reference number of times (N1) is a pre-defined value.

If it is determined that the above-mentioned number (n) of times satisfies the relationship of "n≥N1", the control unit 14 (presentation effect producing section 80) reads the sound data indicating the cheer given for the game character 56 from the storage section 70 and reproduces the sound data to thereby output the cheer given for the game character 56 from the audio output unit 34 (S105).

On the other hand, if it is determined in Step S102 that the game characters 56 do not include the game character 56 predicted to be brought into the situation that allows the predetermined action to be performed by the game character 56 in the near future, or if it is determined in Step S104 that the above-mentioned number (n) of times does not satisfy the relationship of "n≥N1", the control unit 14 (situation determining/predicting section 78) determines whether or not the game characters 56 belonging to the user team include the game character 56 that has been brought into the situation that allows the predetermined action to be performed by the game character 56 (S106). The control unit 14 executes the determination based on the game situation information.

As described above, in the case of this embodiment, the dribble corresponds to the "predetermined action". Therefore, the control unit 14 determines whether or not the game characters 56 belonging to the user team include the game character 56 that has been brought into the situation that allows the dribble to be performed by the game character 56. For example, when the state of any one of the game characters 56 is changed from the state of not keeping the ball 54 to the state of keeping the ball 54, the control unit 14 determines that the one of the game characters 56 has been brought into the situation that allows the dribble to be performed by the game character 56.

If it is determined in Step S106 that the game character 56 that has been brought into the situation that allows the predetermined action to be performed by the game character 56 exists, the control unit 14 reads the number (n) of times that it has been determined in the past that the result of the predetermined action performed by the one of the game characters 56 is the predetermined result, from the determination result data (see FIG. 5) (S107).

For example, if the game character 56 determined in Step S106 to have been brought into the situation that allows the dribble to be performed by the game character 56 is the game character 56 whose ID is "10", the number (n) of times that it has been determined that the dribble performed by the game character 56 whose ID is "10" is successful is read. That is, the value of the "dribble" field within the record whose "ID" field has a value of "10" is read from the determination result data (see FIG. 5).

After the processing of Step S107 is executed, the control unit 14 (presentation effect producing section 80) determines whether or not the number (n) of times acquired in Step S107 satisfies a relationship of "N2≤n<N1" (S108). Here, "N2" represents the reference number of times. The reference number of times (N2) is also a pre-defined value, and has a smaller numerical value than the reference number of times (N1).

If it is determined that the above-mentioned number (n) of times satisfies the relationship of "N2≤n<N1", the control unit 14 (presentation effect producing section 80) reads the sound data indicating the cheer given for the game character 56 from the storage section 70 and reproduces the sound data to thereby output the cheer given for the game character 56 from the audio output unit 34 (S109).

Note that if it is determined in Step S106 that the game character 56 that has been brought into the situation that allows the predetermined action to be started by the game character 56 does not exist, or if it is determined in Step S108 that the above-mentioned number (n) of times does not satisfy the relationship of "N2≤n<N1", the control unit 14 executes the processing of Step S110 described later.

As illustrated in FIG. 7, after the processing of Steps S101 to S109 is executed, the control unit 14 determines whether or not the game characters 56 belonging to the user team include the game character 56 that has performed the predetermined action (S110). As described above, in the case of this embodiment, the dribble corresponds to the "predetermined action". Therefore, the control unit 14 determines whether or not the game characters 56 belonging to the user team include the game character 56 that has performed the dribble. The control unit 14 executes the determination based on the game situation information.

If it is determined that the game character 56 that has performed the predetermined action exists, the control unit 14 (result determining section 76) determines whether or not the result of the predetermined action performed by the game character 56 is the predetermined result (S111). For example, if it is determined that the game character 56 that has performed the dribble exists, the control unit 14 determines whether or not the game character 56 has outrun the game character 58 belonging to the opponent team by dribbling (whether or not the game character 56 has dribbled past the game character 58 belonging to the opponent team). If the game character 56 has outrun the game character 58 belonging to the opponent team by dribbling, the control unit 14 determines that the dribble performed by the game character 56 is successful.

If it is determined that the result of the predetermined action performed by the game character 56 is the predetermined result, the control unit 14 updates the determination result data (see FIG. 5) (S112). For example, if it is determined that the dribble performed by the game character 56 whose ID is "9" is successful, the control unit 14 adds 1 to the value of the "dribble" field within a record whose "ID" field has a value of "9" in the determination result data.

After the processing of Step S112 is executed, the control unit 14 further reads the sound data indicating the cheer given for the game character 56 from the storage section 70 and reproduces the sound data to thereby output the cheer given for the game character 56 from the audio output unit 34 (S113). By the execution of the above-mentioned processing, the cheer given for the game character 56 is output if the dribble performed by the game character 56 is successful.

Note that if it is determined in Step S110 that the game character 56 that has performed the predetermined action does not exist, or if it is determined in Step S111 that the result of the predetermined action performed by the game character 56 is not the predetermined result, the control unit 14 executes the processing of Step S114 described later, without executing the processing of Steps S112 and S113.

After the processing of Steps S110 to S113 is executed, the control unit 14 updates the game screen (S114). For example, the control unit 14 creates the game screen representing the game space 40 viewed from the virtual camera 59 in the VRAM based on the game situation information. The game screen created in the VRAM is displayed on the display unit 32. This brings the processing to an end.

The game device 10 described above is configured so that in, for example, the soccer game, the cheer given for the game character 56 that has been successful in the dribble during the match the reference number of times or more is output at a time point when the game character 56 is brought into the situation that allows the dribble to be performed by the game character 56, or at a time point when the game character 56 is predicted to be brought into the situation that allows the dribble to be performed by the game character 56. That is, the cheer given for the game character 56 is output when it is expected that "the game character 56 performs a dribble and outruns the game character 58 belonging to the opponent team during the execution of the dribble". According to the game device 10, it is possible to produce the presentation effect relating to the game character 56 in a more sophisticated manner.

Note that the game device 10 is configured to change the time at which the cheer given for the game character 56 is output based on the number of times that the dribble performed by the game character 56 has been successful. Specifically, when the number of times that the dribble has been successful is equal to or larger than the reference number of times (N1), the cheer given for the game character 56 is output at the time point when the game character 56 is predicted to be brought into the situation that allows the dribble to be performed by the game character 56, and when the number of times that the dribble has been successful is smaller than the reference number of times (N1), the cheer given for the game character 56 is output at the time point when the game character 56 is actually brought into the situation that allows the dribble to be performed by the game character 56. That is, the cheer given for the game character 56 is output at an earlier time point when it is more highly expected that "the game character 56 performs a dribble and outruns the game character 58 belonging to the opponent team during the execution of the dribble". This allows the presentation effect relating to the game character 56 to be produced in a more sophisticated manner.

Note that the present invention is not limited to the embodiment described above.

(1) For example, the type of cheer given for the game character 56 may differ between Step S105 and Step S109 of FIG. 6. For example, the sound indicating the cheer of a relatively small number of spectators may be output in Step S109, and the sound indicating the cheer of the relatively large number of spectators may be output in Step S105.

With this configuration, the approach (C) described above is realized. Further, with this configuration, the cheer given for the game character 56 is changed based on the degree to which it is expected that "the game character 56 performs a dribble and outruns the game character 58 belonging to the opponent team during the execution of the dribble", with the result that the presentation effect relating to the game character 56 is produced in a more sophisticated manner.

Note that, for example, in Step S109 of FIG. 6, the control unit 14 may output both the sound indicating the cheer given for the game character 56 from the spectators supporting the user team and a sound indicating a boo given for the game character 56 from the spectators supporting the opponent team. On the other hand, in Step S105, the control unit 14 may be configured to output sounds indicating cheers given for the game character 56 by both the spectators supporting the user team and the spectators supporting the opponent team.

With this configuration, when the dribble of the game character 56 is remarkable (that is, when the number of times that the dribble of the game character 56 has been successful is equal to or larger than the reference number of times (N1)), it is possible to express a state in which not only the spectators supporting the user team but also the spectators supporting the opponent team are expecting the dribble of the game character 56. That is, it is possible to produce the presentation effect relating to the game character 56 in an even more sophisticated manner.

(2) For example, at least one of the output volume and the reproduction speed of the cheer given for the game character 56 may differ between Step S105 and Step S109 of FIG. 6. For example, the output volume may be set to a higher level in Step S105 than in Step S109. Further, for example, the reproduction speed may be set to a higher rate in Step S105 than in Step S109.

With this configuration, the approach (D) described above is realized. Further, with this configuration, the cheer given for the game character 56 is changed based on the degree to which it is expected that "the game character 56 performs a dribble and outruns the game character 58 belonging to the opponent team during the execution of the dribble", with the result that the presentation effect relating to the game character 56 is produced in an even more sophisticated manner.

(3) For example, in Step S105 and Step S109 of FIG. 6, the presentation effect may be produced on the game screen instead of or along with the outputting of the cheer given for the game character 56. For example, the image indicating the cheer given for the game character 56 may be displayed on the game screen.

Note that in this case, the type of presentation effect produced on the game screen may differ between Step S105 and Step S109 of FIG. 6. For example, aspects (for example, type or size) of the image indicating the cheer given for the game character 56 may differ. For example, the image indicating the cheer of the relatively small number of spectators may be displayed on the game screen in Step S109, and the image indicating the cheer of the relatively large number of spectators may be displayed on the game screen in Step S105.

With this configuration, the approach (E) described above is realized. Further, with this configuration, the cheer given for the game character 56 is changed based on the degree to which it is expected that "the game character 56 performs a dribble and outruns the game character 58 belonging to the opponent team during the execution of the dribble", with the result that the presentation effect relating to the game character 56 is produced in an even more sophisticated manner.

(4) For example, in Step S102 of FIG. 6, the control unit 14 may determine whether or not a distance between the game character 56 and the ball 54 is equal to or shorter than a reference distance to thereby predict whether or not the game character 56 will be brought into the situation that allows the dribble to be performed by the game character 56. That is, when the distance between the game character 56 and the ball 54 is equal to or shorter than the reference distance, the control unit 14 may determine (predict) that the game character 56 has been (will be) brought into the situation that allows the dribble to be performed by the game character 56.

Note that the above-mentioned reference distance may be changed depending on the game character 56. For example, the reference distance may be set based on the number of times that it has been determined in the past that the dribble of the game character 56 is successful. Specifically, as the above-mentioned number of times becomes larger, the reference distance may be increased.

With this configuration, as the number of times that it has been determined in the past that the dribble of the game character 56 is successful becomes larger, the reference distance is increased. If the reference distance is increased, it is more likely to be determined (predicted) that the game character 56 has been (will be) brought into the situation that allows the dribble to be performed by the game character 56. As a result, a cheer expecting the dribble of the game character 56 is more likely to be output. In short, as the number of times that it has been determined in the past that the dribble of the game character 56 is successful becomes larger, it is possible to set the cheer expecting the dribble of the game character 56 to be more likely to be output.

In order to realize the above-mentioned configuration, the storage section 70 may store information indicating a correlation between the number of times that it has been determined in the past that the dribble of the game character 56 is successful and the reference distance. Further, the above-mentioned information may be set so that the reference distance is increased as the above-mentioned number of times becomes larger. Then, in Step S102 of FIG. 6, the control unit 14 may use the above-mentioned information to set the reference distance based on the number of times that it has been determined in the past that the dribble of the game character 56 is successful.

(5) The description is given above on the assumption that the case where the dribble is successful corresponds to the "case where the result of the dribble is the predetermined result", but for example, the "case where the result of the dribble is the predetermined result" may be a case where the dribble fails.

That is, for example, the sound indicating the boo given for the game character 56 may be output in a case where the game character 56 performs a dribble but the dribble results in failure (for example, the ball 54 is taken away by the game character 58 belonging to the opponent team). In addition, the sound indicating the boo given for the game character 56 may be output also in a case where it is predicted that "the game character 56 performs a dribble but fails in the dribble".

In the case of this approach, the result determining section 76 determines whether or not the dribble performed by the game character 56 has resulted in failure. Then, the number of times that the dribble has been determined to result in failure is stored in the "dribble" field of the determination result data illustrated in FIG. 5.

With this configuration, the sound indicating the boo given for the game character 56 that has failed in the dribble during the match the reference number of times or more may be output at the time point when the game character 56 is brought into the situation that allows the dribble to be performed by the game character 56 or at the time point when the game character 56 is predicted to be brought into the situation that allows the dribble to be performed by the game character 56. That is, the sound indicating the boo given for the game character 56 may be output when it is expected that "the game character 56 performs a dribble but fails in the dribble".

Further, when the number of times that the dribble has failed is equal to or larger than the reference number of times (N1), the sound indicating the boo given for the game character 56 may be output at the time point when the game character 56 is predicted to be brought into the situation that allows the dribble to be performed by the game character 56, and when the number of times that the dribble has failed is smaller than the reference number of times (N1), the sound indicating the boo given for the game character 56 may be output at the time point when the game character 56 is actually brought into the situation that allows the dribble to be performed by the game character 56. In this manner, the sound indicating the boo given for the game character 56 may be output at an earlier time point if it is considered to be more likely that "the game character 56 performs a dribble but fails in the dribble".

(6) For example, the description is given above on the assumption that the dribble corresponds to the "predetermined action", but the "predetermined action" is not limited to the dribble.

For example, the "predetermined action" may be a free kick. That is, the game device 10 may be configured to output the sound indicating the cheer given for the game character 56 in a case where the game character 56 performs a free kick and scores for the user team by the free kick. In addition, the sound indicating the cheer given for the game character 56 may also be output in a case where it is expected that "the game character 56 performs a free kick and scores for the user team by the free kick". Hereinafter, descriptions are given of functions of the result determining section 76, the situation determining/predicting section 78, and the presentation effect producing section 80 on the assumption that the free kick corresponds to the "predetermined action".

When the "predetermined action" is a free kick, the result determining section 76 determines whether or not a free kick has been performed by the game character 56. When a free kick is performed by the game character 56, the result determining section 76 determines whether or not a result of the free kick is the predetermined result. A "case where the result of the free kick is the predetermined result" refers to, for example, a case where the free kick is successful, and more specifically, for example, a case where the score for the user team results from the free kick. That is, when the ball 54 kicked by the game character 56 that has performed the free kick enters the goal 52 of the opponent team, the result determining section 76 determines that the result of the free kick is the predetermined result.

The situation determining/predicting section 78 executes at least one of a determination as to whether or not the game character 56 has been brought into a situation that allows the free kick to be performed by the game character 56 and a prediction as to whether or not the game character 56 will be brought into the situation that allows the free kick to be performed by the game character 56. Here, the "situation that allows the free kick to be performed by the game character 56" refers to, for example, a case where the user team obtains an opportunity for a free kick and the game character 56 is selected as a kicker. Note that at a time point when such a foul as to give the opportunity for a free kick to the user team is committed by the game character 58 belonging to the opponent team, the situation determining/predicting section 78 may determine that the game character 56 has been brought into the situation that allows the free kick to be performed by the game character 56 (or predict that the game character 56 will be brought into the situation that allows the free kick to be performed by the game character 56).

The presentation effect producing section 80 outputs the sound indicating the cheer given for the game character 56 from the audio output unit 34 based on the result of the determination performed the past one or a plurality of times by the result determining section 76, in at least one of a case where it is determined that the game character 56 has been brought into the situation that allows the free kick to be performed by the game character 56 and a case where it is predicted that the game character 56 will be brought into the situation that allows the free kick to be performed by the game character 56. Note that the "result of the determination" used in this case refers to a determination result as to whether or not the result of the free kick performed by the game character 56 is the predetermined result.

With the above-mentioned configuration, for example, the cheer given for the game character 56 that has been successful in the free kick during the match the reference number of times or more is output at the time point when the game character 56 is brought into the situation that allows the free kick to be performed by the game character 56 (or at the time point when the game character 56 is predicted to be brought into the situation that allows the free kick to be performed by the game character 56). That is, the cheer given for the game character 56 is output also in a case where it is expected that the score for the user team will result from the free kick.

(7) For example, the game space 40 may be such a two-dimensional game space that the positions of the game characters 56 and 58 and the like are managed by using two coordinate elements.

(8) For example, the game to which the present invention can be applied is not limited to the soccer game. The present invention can be applied to a sports game configured so that game characters compete in a sports competition. For example, the present invention can also be applied to a game of basketball, American football, ice hockey, or the like.

Further, for example, the present invention can also be applied to a baseball game. In this case, for example, an action of swinging a bat corresponds to the "predetermined action". Further, the "case where the result of the predetermined action is the predetermined result" corresponds to, for example, a home run. Further, the "situation that allows the predetermined action to be performed" corresponds to, for example, a case where the game character is standing in a batter's box.

Further, the present invention can also be applied to games other than the sports games. The present invention can be applied to a game configured so that the game character performs various actions within the game space. By applying the present invention, it is possible to produce the presentation effect relating to the game character in a more sophisticated manner.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A game device, which executes a game that is performed in a virtual environment and that is configured so that a game character performs an action, the game device comprising:

determining means for determining whether or not a result of a predetermined action is a predetermined result in a case where the predetermined action is performed by the game character;

means for acquiring, from a storage, information indicating a number of times that the game character has previously performed the predetermined action with the predetermined result;

determining/predicting means for executing at least one of a determination during current game play as to whether or not the game character has been brought into a situation that allows the predetermined action to be performed by the game character and a prediction during current game play as to whether or not the game character will be brought into the situation that allows the predetermined action to be performed by the game character; and producing means for producing a presentation effect relating to the game character based on the acquired information, in at least one of a case where it is determined that the game character has been brought into the situation that allows the predetermined action to be performed by the game character and a case where it is predicted that the game character will be brought into the situation that allows the predetermined action to be performed by the game character, wherein:

the producing means controls an intensity of the presentation effect based on the acquired information, when the number of times that the game character has previously performed the predetermined action with the predetermined result is equal to or larger than a first reference number of times, the presentation effect is produced by the producing means, and when the number of times is equal to or larger than the first reference number of times and is smaller than a second reference number of times which is larger than the first reference number of times, the presentation effect is produced by the producing means at a first intensity, and when the number of times is equal to or larger than the second reference number of times, the presentation effect is produced by the producing means at a second intensity that is larger than the first intensity.

2. The game device according to claim 1, wherein the producing means comprises means for controlling a time at which to produce the presentation effect based on the acquired information.

3. The game device according to claim 1, wherein the producing means comprises:
   means for outputting a sound as the presentation effect from audio output means; and
   means for controlling at least one of a type of the sound, an output volume thereof, and a reproduction speed thereof based on the acquired information.

4. The game device according to claim 1, further comprising means for displaying a game screen on display means;
   wherein the producing means comprises:
   means for producing the presentation effect on the game screen; and
   means for controlling a manner of the presentation effect produced on the game screen based on the acquired information.

5. The game device according to claim 1, wherein:
   the game comprises a game configured so that game characters compete in a competition carried out by using a moving object;
   the predetermined action comprises a predetermined action performed by the game character in a case where the game character keeps the moving object;
   the determining/predicting means determines whether or not a distance between the game character and the moving object is equal to or shorter than a reference distance to thereby predict whether or not the game character will be brought into the situation that allows the predetermined action to be performed by the game character; and
   the determining/predicting means comprises means for setting the reference distance based on the result of the acquired information.

6. A control method for a game device including at least one microprocessor, which executes a game that is performed in a virtual environment and that is configured so that a game character performs an action, the control method comprising:
   determining, by the at least one microprocessor in a result determination, whether a result of a predetermined action is a predetermined result in a case where the predetermined action is performed by the game character;
   acquiring, by the at least one microprocessor from a storage, information indicating a number of times that the game character has previously performed the predetermined action with the predetermined result;
   executing, by the at least one microprocessor, at least one of a determination during current game play as to whether or not the game character has been brought into a situation that allows the predetermined action to be performed by the game character and a prediction during current game play as to whether or not the game character will be brought into the situation that allows the predetermined action to be performed by the game character; and
   producing, by the at least one microprocessor, a presentation effect relating to the game character based on the acquired information, in at least one of a case where it is determined that the game character has been brought into the situation that allows the predetermined action to be performed by the game character and a case where it is predicted that the game character will be brought into the situation that allows the predetermined action to be performed by the game character,
   wherein:
   the producing comprises controlling an intensity of the presentation effect based on the acquired information,
   when the number of times that the game character has previously performed the predetermined action with the predetermined result is equal to or larger than a first reference number of times, the presentation effect is produced by the producing means, and
   when the number of times is equal to or larger than the first reference number of times and is smaller than a second reference number of times which is larger than the first reference number of times, the presentation effect is produced by the producing means at a first intensity, and
   when the number of times is equal to or larger than the second reference number of times, the presentation effect is produced at a second intensity that is larger than the first intensity.

7. A non-transitory computer readable information storage medium storing a program for controlling a computer to function as a game device which executes a game that is performed in a virtual environment and that is configured so that a game character performs an action, the program controlling the computer to function as:
   determining means for determining whether or not a result of a predetermined action is a predetermined result in a case where the predetermined action is performed by the game character;
   means for acquiring, from a storage, information indicating a number of times that the game character has previously performed the predetermined action with the predetermined result;
   determining/predicting means for executing at least one of a determination during current game play as to whether or not the game character has been brought into a situation that allows the predetermined action to be performed by the game character and a prediction during current game play as to whether or not the game character will be brought into the situation that allows the predetermined action to be performed by the game character; and
   producing means for producing a presentation effect relating to the game character based on the acquired information, in at least one of a case where it is determined that the game character has been brought into the situation that allows the predetermined action to be performed by the game character and a case where it is predicted that the game character will be brought into the situation that allows the predetermined action to be performed by the game character,
   wherein:
   the producing means controls an intensity of the presentation effect based on the acquired information,
   when the number of times that the game character has previously performed the predetermined action with the predetermined result is equal to or larger than a first reference number of times, the presentation effect is produced by the producing means, and
   when the number of times is equal to or larger than the first reference number of times and is smaller than a second reference number of times which is larger than the first reference number of times, the presentation effect is produced by the producing means at a first intensity, and
   when the number of times is equal to or larger than the second reference number of times, the presentation effect is produced by the producing means at a second intensity that is larger than the first intensity.

8. A game device, which executes a game that is performed in a virtual environment and that is configured so that a game character performs an action, the game device comprising:
at least one memory operable to store program code; and
at least one processor operable to access said memory and read said program code and operate as instructed by said program code, said program code including:
determining code that causes the at least one processor to determine whether a result of a predetermined action is a predetermined result in a case where the predetermined action is performed by the game character;
acquiring code that causes the at least one processor to acquire, from a storage, information indicating a number of times that the game character has previously performed the predetermined action with the predetermined result;
determining/predicting code that causes the at least one processor to execute at least one of a determination during current game play as to whether the game character has been brought into a situation that allows the predetermined action to be performed by the game character and a prediction during current game play as to whether the game character will be brought into the situation that allows the predetermined action to be performed by the game character; and
producing code that causes the at least one processor to produce a presentation effect relating to the game character based on the acquired information, in at least one of a case where it is determined that the game character has been brought into the situation that allows the predetermined action to be performed by the game character and a case where it is predicted that the game character will be brought into the situation that allows the predetermined action to be performed by the game character,
wherein:
the producing code controls the at least one processor to change an intensity of the presentation effect based on the acquired information,
when the number of times that the game character has previously performed the predetermined action with the predetermined result is equal to or larger than a first reference number of times, the producing code controls the at least one processor to generate the presentation effect, and
when the number of times is equal to or larger than the first reference number of times and is smaller than a second reference number of times which is larger than the first reference number of times, the producing code controls the at least one processor to generate the presentation effect at a first intensity, and
when the number of times is equal to or larger than the second reference number of times, the producing code controls the at least one processor to generate the presentation effect at a second intensity that is larger than the first intensity.

9. A non-transitory computer readable information storage medium storing a program for controlling a computer to function as a game device which executes a game that is performed in a virtual environment and that is configured so that a game character performs an action, the program controlling the computer to function as:
a determining section that determines whether a result of a predetermined action is a predetermined result in a case where the predetermined action is performed by the game character;
an acquiring section that acquires, from a storage, information indicating a number of times that the game character has previously performed the predetermined action with the predetermined result;
a determining/predicting section that executes at least one of a determination during current game play as to whether the game character has been brought into a situation that allows the predetermined action to be performed by the game character and a prediction during current game play as to whether the game character will be brought into the situation that allows the predetermined action to be performed by the game character; and
a producing section that produces a presentation effect relating to the game character based on the acquired information, in at least one of a case where it is determined that the game character has been brought into the situation that allows the predetermined action to be performed by the game character and a case where it is predicted that the game character will be brought into the situation that allows the predetermined action to be performed by the game character,
wherein:
the producing section controls an intensity of the presentation effect based on the acquired information,
when the number of times that the game character has previously performed the predetermined action with the predetermined result is equal to or larger than a first reference number of times, the presentation effect is produced by the producing section, and
when the number of times is equal to or larger than the first reference number of times and is smaller than a second reference number of times which is larger than the first reference number of times, the presentation effect is produced by the producing section at a first intensity, and
when the number of times is equal to or larger than the second reference number of times, the presentation effect is produced by the producing section at a second intensity that is larger than the first intensity.

10. A game device, which executes a game that is performed in a virtual environment and that is configured so that a game character performs an action, the game device comprising:
at least one microprocessor that:
determines whether a result of a predetermined action is a predetermined result in a case where the predetermined action is performed by the game character;
acquires, from a storage, information indicating a number of times that the game character has previously performed the predetermined action with the predetermined result;
executes at least one of a determination during current game play as to whether the game character has been brought into a situation that allows the predetermined action to be performed by the game character and a prediction during current game play as to whether the game character will be brought into the situation that allows the predetermined action to be performed by the game character; and
produces a presentation effect relating to the game character based on the acquired information, in at least one of a case where it is determined that the game character has been brought into the situation that allows the predetermined action to be performed by the game character and a case where it is predicted that the game character will be brought into the situation that allows the predetermined action to be performed by the game character, wherein:

the at least one microprocessor controls an intensity of the presentation effect based on the acquired information, when the number of times that the game character has previously performed the predetermined action with the predetermined result is equal to or larger than a first reference number of times, the presentation effect is produced, and when the number of times is equal to or larger than the first reference number of times and is smaller than a second reference number of times which is larger than the first reference number of times, the presentation effect is produced at a first intensity, and when the number of times is equal to or larger than the second reference number of times, the presentation effect is produced at a second intensity that is larger than the first intensity.

11. A non-transitory computer readable information storage medium storing a program for controlling a computer to function as a game device which executes a game that is performed in a virtual environment and that is configured so that a game character performs an action, the program controlling at least one microprocessor of the computer to:

determines whether a result of a predetermined action is a predetermined result in a case where the predetermined action is performed by the game character;

acquires, from a storage, information indicating a number of times that the game character has previously performed the predetermined action with the predetermined result;

executes at least one of a determination during current game play as to whether the game character has been brought into a situation that allows the predetermined action to be performed by the game character and a prediction during current game play as to whether the game character will be brought into the situation that allows the predetermined action to be performed by the game character; and produces a presentation effect relating to the game character based on the acquired information, in at least one of a case where it is determined that the game character has been brought into the situation that allows the predetermined action to be performed by the game character and a case where it is predicted that the game character will be brought into the situation that allows the predetermined action to be performed by the game character, wherein:

the at least one microprocessor controls an intensity of the presentation effect based on the acquired information, when the number of times that the game character has previously performed the predetermined action with the predetermined result is equal to or larger than a first reference number of times, the presentation effect is produced, and when the number of times is equal to or larger than the first reference number of times and is smaller than a second reference number of times which is larger than the first reference number of times, the presentation effect is produced at a first intensity, and when the number of times is equal to or larger than the second reference number of times, the presentation effect is produced at a second intensity that is larger than the first intensity.

\* \* \* \* \*